United States Patent [19]

Correge et al.

[11] Patent Number: 4,703,908
[45] Date of Patent: Nov. 3, 1987

[54] SAFETY DEVICE AGAINST A SUDDEN DECOMPRESSION IN THE LUGGAGE COMPARTMENT OF AN AIRCRAFT

[75] Inventors: Gilbert Correge, 10, Avenue Frédéric, Mistral Blagnac (Haute,Garonne); Eugène Dominique, 15, rue G. Doumergue, Tournefeuille (Haute, Garonne); Danilo Ciprian, Cidex 43, Chemin de Peyrelon Aussonne-, Blagnac (Haute Garonne), all of France

[73] Assignee: Gilbert Correge et a., Paris, France

[21] Appl. No.: 674,329

[22] Filed: Apr. 7, 1976

[30] Foreign Application Priority Data

Apr. 11, 1975 [FR] France .................. 75 11349

[51] Int. Cl.⁴ ............................................. B64D 13/04
[52] U.S. Cl. ..................................... 244/118.5; 98/1.5; 244/129.1; 244/121
[58] Field of Search ............... 244/118 R, 118 P, 121, 244/129 R, 119, 117 R; 98/1.5, 119; 62/DIG. 5; 49/31, 141, 21; 137/513.3; 52/1

[56] References Cited

U.S. PATENT DOCUMENTS

| | | | |
|---|---|---|---|
| 2,399,326 | 4/1946 | Crot | 98/1.5 |
| 2,509,362 | 5/1950 | Miller | 49/141 |
| 3,190,209 | 6/1965 | Goetz | 98/114 |
| 3,211,075 | 10/1965 | Robson | 98/1.5 |
| 3,230,859 | 1/1966 | O'Hea et al. | 52/1 |
| 3,425,333 | 2/1969 | Wachter | 98/1.5 |
| 3,775,915 | 12/1973 | Chambers et al. | 52/1 |
| 3,861,080 | 1/1975 | Schibli et al. | 52/1 |
| 3,938,764 | 2/1976 | McIntyre et al. | 244/129 R |
| 4,022,117 | 5/1977 | Mallian | 98/119 |
| 4,033,247 | 7/1977 | Murphy | 98/119 |

Primary Examiner—Galen Barefoot
Attorney, Agent, or Firm—William D. Stokes

[57] ABSTRACT

The present invention relates to an aircraft of which the structure comprises a longitudinal floor separating the passenger cabin from at least one luggage compartment pressurized normally and communicating via peripheral openings in said floor, these openings being concealed on the cabin side by air shafts, fixed obliquely to the inner wall of the cabin and arranged so that their orifice near said floor opens into said cabin and their other orifice communicates with one of said openings, creating an air-circulation baffle, in which aircraft said air shafts are articulated, on the side away from said floor, to said inner wall of the cabin, to be able spontaneously to clear the corresponding opening in the case of a sudden decompression in said luggage compartment, thus providing protection against the effects of such an abrupt decompression therein.

4 Claims, 6 Drawing Figures

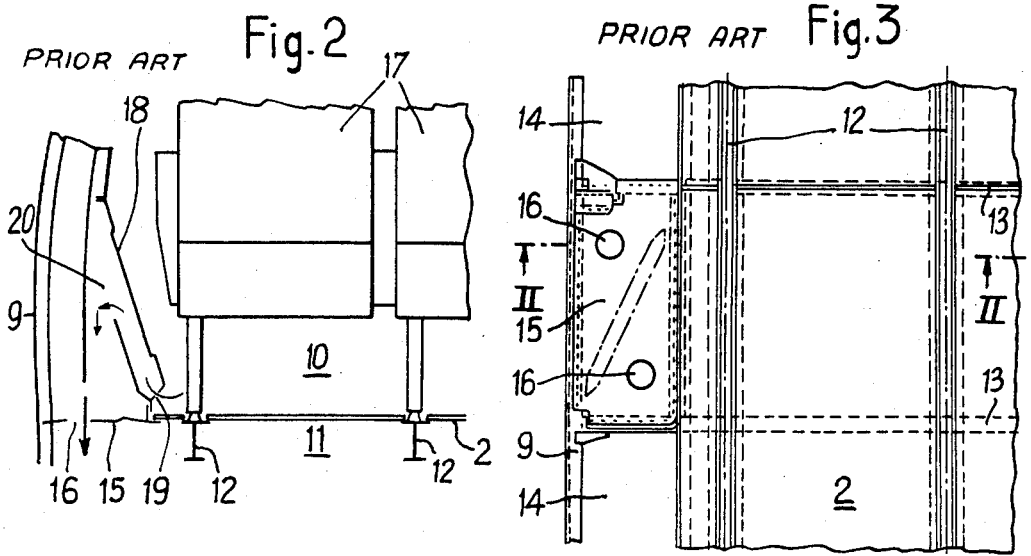

SAFETY DEVICE AGAINST A SUDDEN DECOMPRESSION IN THE LUGGAGE COMPARTMENT OF AN AIRCRAFT

The present invention relates to a safety device against a sudden decompression in the luggage compartment of an aircraft, particularly intended for heavy-transport aircraft. It makes it possible to avoid the breaking and collapse of the aircraft floor if there is a sudden decompression of a luggage compartment, said decompression being accidental and due, for example, to the opening or loss of a luggage compartment door, or to an explosion in the luggage compartment causing a considerable gap to be formed in the lower part of the fuselage.

The fuselage of modern aircraft is known to comprise a longitudinal floor separating it into two superposed cavities. The upper cavity is arranged as passenger cabin and the lower cavity as luggage compartment or group of compartments. The volumes of these two cavities are generally the same and consequently the floor which separates them has a considerable surface area. If only the passenger cabin were pressurised, the floor would not be able to withstand the forces due to this pressurisation, unless it were very reinforced and which would make it too heavy. The passenger cabin and the luggage compartments are therefore at equal pressures.

Moreover it is known that, in order to balance the pressures prevailing in the passenger cabin and in the luggage compartment or compartments, under normal flying conditions, the floor normally comprises elongated peripheral openings placing said cabin and said compartments in communication. The surface area of these openings is relatively limited for reasons of comfort of the passengers and particularly for reasons of heat and sound insulation. These openings are often used for evacuating the spent air from the cabin, via the luggage compartments, the valves for evacuating this air to the outside being placed on the outside walls of said luggage compartments.

On the passenger cabin side, said openings are concealed by elongated air shafts, fixed obliquely to the inner wall of the fuselage (or structure) and arranged so that their lower orifice opens out into said cabin whilst their upper orifice is in communication with said openings. A communication baffle is thus created between the cabin and the luggage compartments.

When the or each luggage compartment is accidentally decompressed suddenly, due to the unforeseen opening of a door that has not been closed properly or further to an explosion therein, which causes part of the outer wall of a luggage compartment to be torn away, the passage of air through said openings and said baffles is too weak for the air pressure to equalize rapidly on either side of the floor and said latter is then subjected to forces leading it to collapse and be partially torn away.

In addition to the risks of the passengers being injured, this collapse has other serious consequences on the resistance of the structure of the aircraft and on the breaking of the hydraulic and electric controls which pass beneath said floor.

In an attempt to avoid these drawbacks and rapidly equalize the two air pressures prevailing respectively on the two sides of the floor, it has already been proposed to employ known means consisting of calibrated valves and wall elements of reduced section arranged in the floor, whereby tearing only occurs with supplementary effort.

The valves are heavy, expensive and difficult to position, particularly in a wall not provided to receive them. The wall elements of reduced section are fragile. They cannot be used in a zone of the floor intended for loading, and their calibration is unreliable. These elements have to be precision-machined and are therefore expensive. Moreover, the walls which receives them must be provided to this end.

Furthermore, the use of supple calibrated plugs has also been proposed, but such plugs can only be of small dimensions and many are therefore required to obtain a surface area of passage equivalent to that of a door for loading the luggage compartment of a heavy transport aircraft. The surface area of such a door may reach 5 to 6 $m^2$ and, to obtain a very rapid equilization of the pressures on each side of the floor in case of loss of said door, a surface area of passage equivalent to its own surface area must be provided for.

The present invention remedies these drawbacks and enables a considerable passage of air to be obtained, whilst necessitating only slight modifications of the aircraft, thus at little cost, and only negligibly increasing the weight thereof.

To this end, in accordance with the invention, an aircraft whose structure comprise a longitudinal floor for separating the passenger cabin from the or each luggage compartment, which are pressurised normally and in communication by peripheral openings in said floor, these openings being concealed, on the cabin side, by air shafts, fixed obliquely with respect to the inner wall of the cabin and arranged so that their orifice near the floor opens out into said cabin and their other orifice is in communication with one of said openings creating an air circulation baffle, is characterised in that, on the side away from said floor, said air shafts are articulated to said inner wall of the cabin in order to be able spontaneously to clear the corresponding opening in the case of a sudden decompression in said luggage compartment.

In this way, in the case of sudden decompression in the luggage compartment, the baffles may be avoided and the cabin and the or each luggage compartment may be placed directly in communication through said openings.

In order further to facilitate the passage of air between the cabin and luggage compartment, the peripheral openings in the floor may be larger than those normally provided in aircraft.

Moreover, in certain of the openings of known aircraft, rigidifying panels are arranged. For the same purpose, these panels may be replaced by rods which clear the passage of air to a maximum. Under normal pressure conditions, the air shafts are maintained in the position in which they conceal the openings either by calibrated springs or by breakable pins.

To avoid the unexpected pivoting of an air shaft, a protective grill may be provided for each of them.

The improvement according to the invention therefore enables the problem of decompression of the luggage compartment to be solved at little cost, with no increase in weight nor bulk of the aircraft. Moreover, it is easily adaptable to heretofore known aircraft and does not hamper with the transformation of the interior arrangements of the structure, for example if the number of seats is changed or a cargo aircraft is converted into a passenger aircraft, or vice versa.

The invention will be more readily understood on reading the following description with reference to the accompanying drawings, in which:

FIG. 2 is a schematic partial view, in enlarged section of the connection of said floor to the structure of an aircraft of known type.

FIG. 3 is a plan view of FIG. 2, the seats and air shafts being assumed to have been removed.

Figure 4:
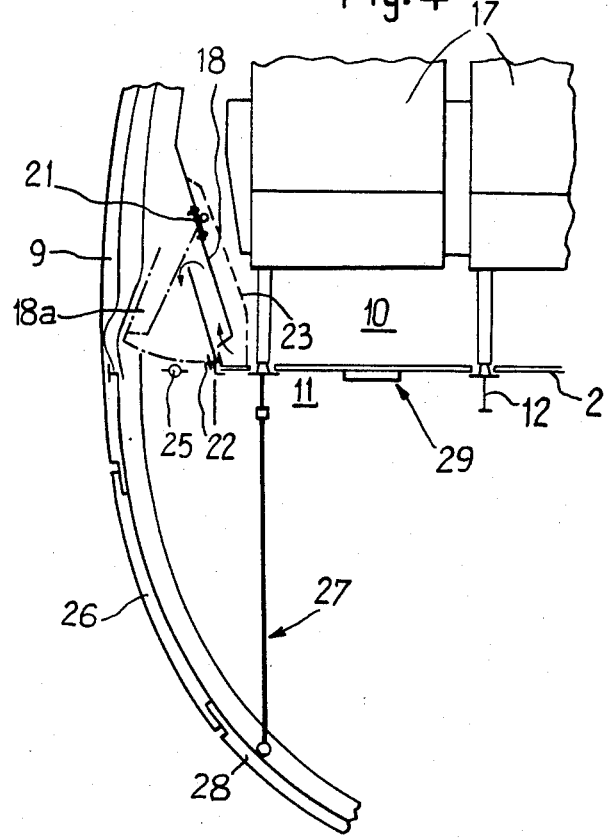

FIG. 4 corresponds to FIG. 2 and illustrates the invention.

Figure 5:
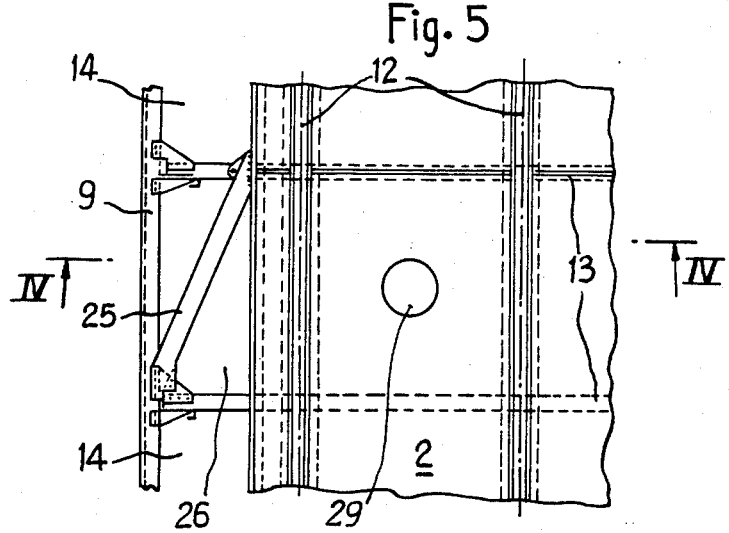

FIG. 5 corresponds to FIG. 3 and shows an improvement according to the invention.

Figure 6:
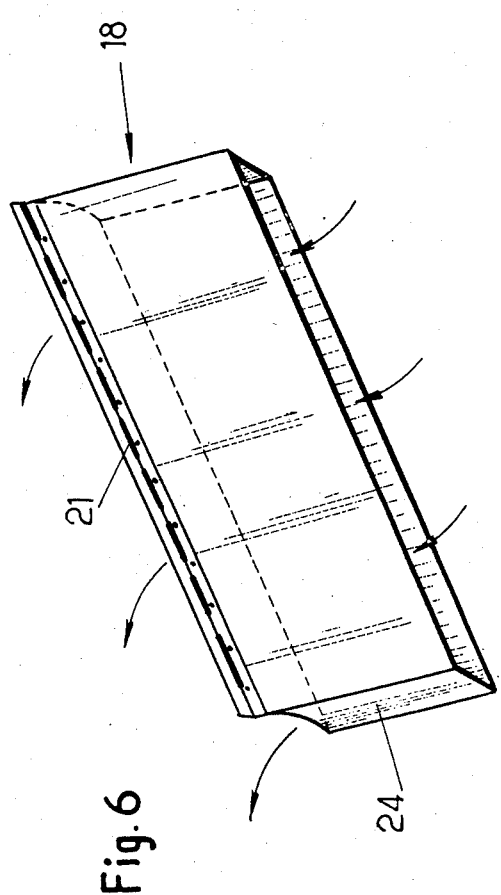

FIG. 6 is a perspective view of an air shaft according to the invention.

Figure 1:
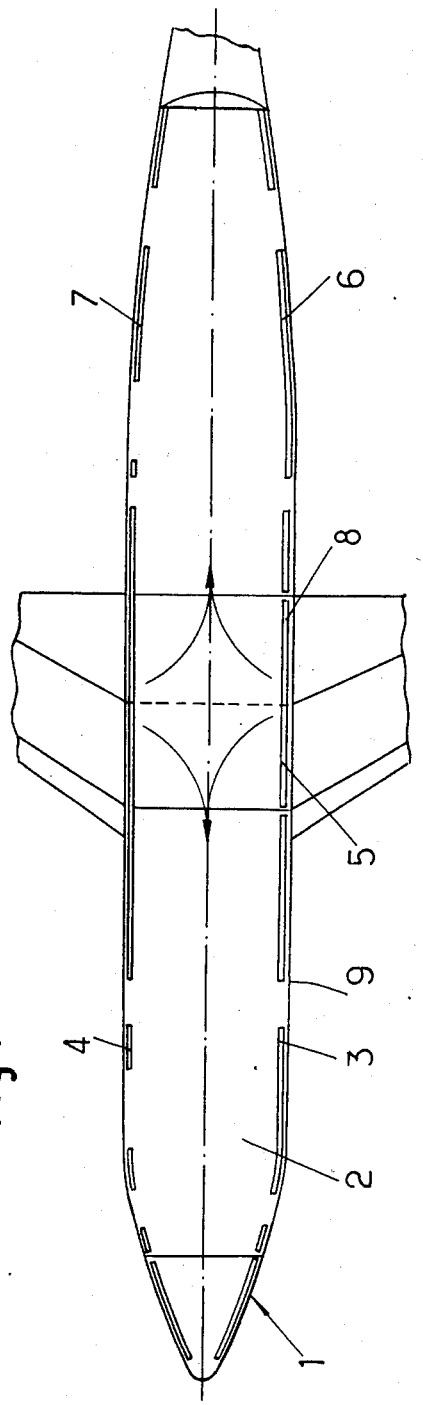
FIG. 1 is a view in section of an aircraft structure, showing the floor separating the passenger cabin from the luggage compartments.

Referring now to the drawings, FIG. 1 shows the structure of an aircraft 1 which is cut longitudinally by floor 2 separating it into passenger cabin and the luggage compartments. Said floor comprises elongated peripheral openings, i.e. 3,4,5,6,7 and 8 made along the outer wall 9 of the fuselage. These openings place cabin 10 and luggage compartments 11 in communication and the supports of said floor pass therethrough at certain places, as will be seen hereinafter. The surface area of these openings is normally of the order of 3 to 4 m² in known aircraft and, according to the invention, it is advantageously substantially equal to the surface of the luggage compartment doors of said aircraft. This surface area may therefore be of the order of 9 m² for example.

As shown in FIGS. 2 and 3, in a known aircraft, the floor 2 rests on longitudinal supports 12 and transverse supports 13, connected to the wall 9 of the structure. At an opening 3 to 8, the edge of the floor 2 is separated from the wall 9 by a space 14. This space 14 is partially closed by a rigidifying panel 15, possibly perforated with holes 16. Between the seats 17 and the wall 9 are arranged elongated air shafts 18 forming double-wall plinths and constituting an air passage for the spent air evacuated from the cabin to the outside via the luggage compartment.

These air shafts 18 conceal spaces 14 on the cabin 10 side. They are oblique with respect to the wall 9 and fixed thereto at their upper ends. They suck the air through their lower orifice 19 and reject it through their upper orifice 20, after which this air passes through the spaces 14 and the holes 16 to pass into the luggage compartment 11.

FIGS. 4 and 5 correspond respectively to FIGS. 2 and 3, but they illustrate the improvements of the invention. In these Figures like elements have like references.

As shown in FIG. 4, according to the invention, the upper point of the air shafts 18 is articulated on wall 9 (or an element fast therewith such as an internal decorative panel) by a hinge 21 or by any conventional means and removably connected to the floor 2 by breakable pins 22. They may also be held in place by a calibrated spring (not shown) tending to press them towards the inside of the cabin.

When operation is normal, the air circulates in the air shafts 18 as indicated previously. If there is a sudden decompression in the luggage compartment, each air shaft 18 is subjected to a suction force towards the wall 9 of said fuselage, the breakable pins 22 break (or the spings bend) and said air shafts 18 take position 18a, clearing spaces 14 and thus allowing a large passage of air between the cabin 10 and the luggage compartment 11.

To avoid a passenger inadvertently pushing an air shaft 18, the latter is covered by a protective grill 23. When the openings 3 to 8 are very long, it is advantageous to make the air shafts in separate elements 24 of 1 to 2 meters (cf. FIG. 6) and of substantially parallelepipedal form.

As shown in FIG. 5, the panels 15 are replaced by tie-rods 25 in order to increase the passage through the spaces 14 of openings 3 to 8 to a maximum.

Perpendicularly to the luggage compartment door 26, the floor 2 may be reinforced by vertical stays 27 placed between the edge of the floor 2 and the frame 28 of said doors, for example. Alternately, a supplementary passage is provided by a valve 29 placed under the seat, for example. In fact, at the moment of an abrupt decompression of the luggage compartment, a load peak may be produced on the floor near said doors.

The passage of air thus established, advantageously having a surface area equal to the total surface area of the luggage compartment doors, a decompression may occur without causing collapse of the floor.

What we claim is:

1. An aircraft of which the structure comprises:
   a passenger cabin;
   at least one normally pressurized luggage compartment;
   a longitudinal floor separating the passenger cabin from the luggage compartment;
   openings formed in the peripheria of the floor communicating the cabin and the luggage compartment;
   air shafts disposed on the cabin side of the floor disposed obliquely with respect to the walls of the cabin, each of said shafts having one of its orifices near the floor and opening out into the cabin and its other orifice incommunication with one of the openings in the floor, said air shaft creating an air-circulating baffle whereby under normal conditions air from the passenger cabin enters each of said shafts through its orifice near the floor and flows through said shaft and out the orifice in the other end of said shaft, breakable pins securing said shaft in a position concealing said openings during normal pressure conditions, said air shafts being articulated to the walls of the cabin whereby there is a spontaneous clearing of the opening responsive to a sudden decompression in the luggage compartment.

2. Apparatus according to claim 1 wherein said ventilation devices include protective grills.

3. Apparatus according to claim 1 and further including a door provided for said luggage compartments, and wherein said floor is reinforced by vertical stays disposed perpendicular to said door.

4. Apparatus according to claim 1 and further including a door provided for said luggage compartments, and a valve arranged in said floor near said door.

* * * * *